(12) United States Patent
Malghan

(10) Patent No.: US 11,052,956 B2
(45) Date of Patent: Jul. 6, 2021

(54) TRACKED ROBOTS HAVING TRACK WITH ROLLER WHEELS

(71) Applicant: Toyota Research Institute, Inc., Los Altos, CA (US)

(72) Inventor: Suhas S. Malghan, Swampscott, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 246 days.

(21) Appl. No.: 16/142,897

(22) Filed: Sep. 26, 2018

(65) Prior Publication Data

US 2020/0094893 A1    Mar. 26, 2020

(51) Int. Cl.
*B62D 55/12*    (2006.01)
*B62D 55/24*    (2006.01)
*B62D 55/10*    (2006.01)

(52) U.S. Cl.
CPC ............. *B62D 55/12* (2013.01); *B62D 55/10* (2013.01); *B62D 55/24* (2013.01)

(58) Field of Classification Search
CPC ......... B62D 55/10; B62D 55/12; B62D 55/24
USPC .................................................. 180/9.1, 9.62
See application file for complete search history.

(56) References Cited

U.S. PATENT DOCUMENTS

| | | | |
|---|---|---|---|
| 1,443,787 A | 1/1923 | French | |
| 2,696,927 A | 12/1954 | Copping | |
| 2,987,168 A | 6/1961 | Franz | |
| 6,427,823 B1 | 8/2002 | Ishikawa et al. | |
| 6,540,060 B1 | 4/2003 | Fargo et al. | |
| 9,050,888 B2 | 6/2015 | Gettings et al. | |
| 2006/0058137 A1 | 3/2006 | Matsuura | |
| 2016/0214664 A1* | 7/2016 | Domholt | B62D 55/12 |
| 2017/0327317 A1* | 11/2017 | Tschantz | B65G 17/02 |

FOREIGN PATENT DOCUMENTS

| | | |
|---|---|---|
| JP | 2007223775 A | 9/2017 |
| WO | 2011129572 A2 | 10/2011 |

* cited by examiner

*Primary Examiner* — Minnah L Seoh
*Assistant Examiner* — Felicia L. Brittman
(74) *Attorney, Agent, or Firm* — Dinsmore & Shohl LLP

(57) ABSTRACT

An anti-scrubbing mechanism in the track of a tracked robot or a tracked vehicle is disclosed. In one embodiment, a tracked robot includes one or more tracks coupled to a chassis of the tracked robot. Each of the one or more tracks include one or more track segments along a length of each of the one or more tracks and a plurality of rollers coupled to the one or more track segments along the length of each of the one or more tracks, wherein each of the plurality of rollers and the one or more track segments are arranged alternately along a width of each of the one or more tracks. The tracked robot further includes a drive system mechanically coupled to the one or more tracks and the chassis of the tracked robot.

15 Claims, 3 Drawing Sheets

TRACKED ROBOTS HAVING TRACK WITH ROLLER WHEELS

TECHNICAL FIELD

The present specification generally relates to the field of robotic mobility and more specifically, to an anti-scrubbing mechanism in the track of a tracked robot or a tracked vehicle.

BACKGROUND

Some robots and vehicles use tracks for mobility purposes. Tracks offer significant benefit in maneuvering and overcoming obstacles. One advantage of a tracked robot or a tracked vehicle is the ability to make zero-radius turns by actuating the two tracks in opposite directions. However, zero-radius turns may cause high friction between the track and the driving wheels of the tracked robot, thereby causing damage to both.

Accordingly, it is desirable to find a way to help reduce scrubbing and prevent high friction between the track and the driving wheels during zero-radius turns for a tracked robot or a tracked vehicle.

SUMMARY

The present specification relates to anti-scrubbing mechanism in the track of a tracked robot or a tracked vehicle. In one embodiment, a tracked robot is disclosed. The tracked robot includes one or more tracks coupled to a chassis of the tracked robot. Each of the one or more tracks includes one or more track segments along a length of each of the one or more tracks and a plurality of rollers coupled to the one or more track segments along the length of each of the one or more tracks. The tracked robot further includes a drive system mechanically coupled to the one or more tracks and the chassis of the tracked robot.

In another embodiment, a track system for a vehicle is disclosed. The track system includes one or more tracks coupled to a chassis of the vehicle. Each of the one or more tracks includes one or more track segments along a length of each of the one or more tracks and a plurality of rollers coupled to the one or more track segments along the length of each of the one or more tracks. The track system further includes a drive system mechanically coupled to the one or more tracks and the chassis of the vehicle.

In yet another embodiment, a track robot is disclosed. The tracked robot includes one or more tracks coupled to a chassis of the tracked robot. Each of the one or more tracks includes one or more track segments along a length of each of the one or more tracks and a plurality of rollers coupled to the one or more track segments along the length of each of the one or more tracks. Each of the plurality of rollers and the one or more track segments are arranged alternately along a width of each of the one or more tracks. The tracked robot further includes a drive system mechanically coupled to the one or more tracks and the chassis of the tracked robot. The drive system includes one or more driving wheels configured to propel the tracked robot forward or backward, wherein each of the one or more tracks are rotatably wrapped around at least one of the one or more driving wheels. One or more toothed sprockets are coupled to each of the one or more driving wheels. A motor is coupled to the one or more driving wheels and configured to power each of the one or more tracks in a forward direction or a backward direction through the one or more toothed sprockets. The drive system further includes one or more fixed wheels coupled to each of the one or more tracks and the one or more driving wheels.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to an anti-scrubbing mechanism in a track of a tracked robot or a tracked vehicle. In particular, embodiments described herein are directed to various arrangements of roller wheels disposed in the track of the tracked robot or the tracked vehicle.

As described in more detail herein, the track of a tracked robot or a tracked vehicle is provided with roller wheels coupled to segments of the track. The roller wheels are free to rotate about an axis perpendicular to the direction of motion of the tracked robot or the tracked vehicle. As the tracked robot or the tracked vehicle is propelled and maneuvered by the track, the roller wheels coupled to the track enable the tracked robot or the tracked vehicle to swiftly make zero-radius turns for moving in the opposite direction as well as acute-angle turns, where the angle between the pre-turn path and the post-turn path is less than about 90 degrees. This prevents scrubbing and friction between the track and the driving wheels of the tracked robot or the tracked vehicle, which can cause damage to the surface of the track as well as the driving wheels. As the roller wheels disposed within the track are actuated, the tracked robot or the tracked vehicle is able to make a smooth zero-radius turn or acute-angle turn.

Figure 1:
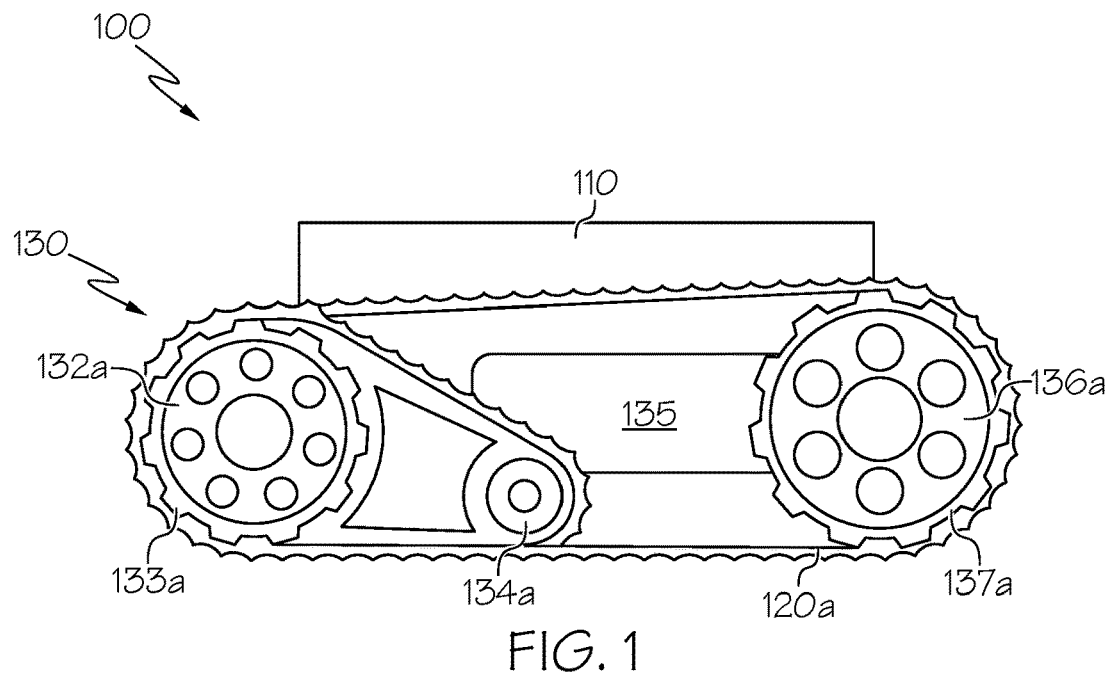
FIG. 1 depicts a side view of a tracked robot, according to one or more embodiments shown and described herein.
Figure 2:
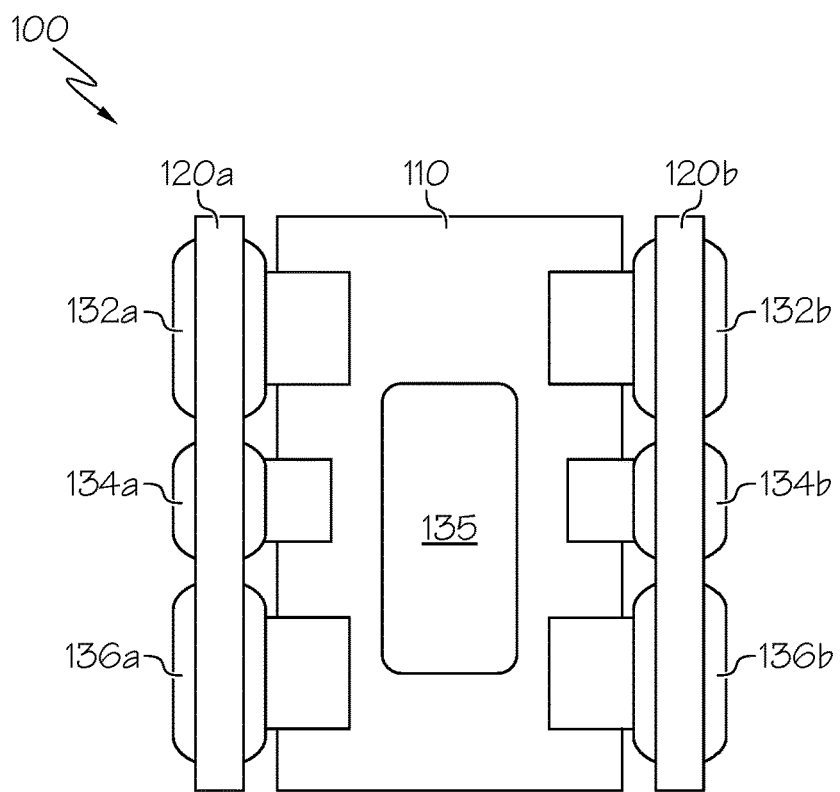
FIG. 2 depicts a bottom view of the tracked robot, according to one or more embodiments shown and described herein.

FIGS. 1 and 2 depict a side view and a bottom view of an exemplary tracked robot 100. The tracked robot 100 has a chassis 110 which may include at least a navigation unit, a control unit and a payload module (not shown) for housing provisions for a mission of the tracked robot 100. The chassis 110 holds a variety of actuators, sensors, electronics, and batteries required for operation and communication with the tracked robot 100. The chassis 110 may be made of a metal such as, but not limited to, aluminum, titanium, copper, steel, iron, brass, sheet metal, or combinations thereof; alternatively, the chassis 110 may be made of a non-metal such as, but not limited to, carbon fiber, polycarbonate, concrete, metal foam, wood, a polymer, or combinations thereof.

The tracked robot 100 includes chain-like tracks 120a, 120b coupled to opposite sides of the chassis 110 and parallel to each other. The tracks 120a, 120b effectively create, on each side of the tracked robot 100, a wheel with a large surface area contacting the surface on which the tracked robot 100 moves. The large surface area of the tracks 120a, 120b enhances the stability of the tracked robot 100 by distributing the weight of the tracked robot 100. If both tracks 120a, 120b are actuated in the same direction, the tracked robot 100 is propelled in a straight line forward or backward. If the tracks 120a, 120b are actuated in opposite directions relative to each other, the tracked robot 100 negotiates a turn to the left or to the right. The tracks 120a, 120b may be made of a polymer such as Thermo Plastic Urethane (TPU), elastomers, metal mesh, carbon fiber based materials, synthetic rubber reinforced with steel wires, or combinations thereof. The tracks 120a, 120b may be mounted with sensors (not shown) to measure position, speed, and/or torque of the tracked robot 100 as well as to detect presence of obstacles.

A drive system 130 is mechanically coupled to the tracks 120a, 120b and the chassis 110 of the tracked robot 100. The drive system 130 includes the driving wheels 132a, 136a on one side and the driving wheels 132b, 136b on the opposite side of the tracked robot 100. The driving wheels 132a, 136a, 132b and 136b move the tracked robot 100 forward or backward. The track 120a is rotatably wrapped around the driving wheels 132a, 136a while the track 120b is rotatably wrapped around the driving wheels 132b, 136b. The driving wheels 132a, 136a, 132b, and 136b may be made of TPU, Santoprene, any other suitable polymer, elastomer, an elastomer/polymer blend, a metal, or combinations thereof.

The driving wheels 132a and 136a have toothed sprockets 133a and 137a respectively, while the driving wheels 132b and 136b have toothed sprockets 133b and 137b respectively. The toothed design of the sprockets 133a, 137a, 133b, and 137b ensures that the driving wheels 132a, 136a and 132b, 136b have sufficient traction on the tracks 120a, 120b as the tracked robot 100 is driven.

A motor 135 is disposed in the chassis 110 and coupled to the driving wheels 132a, 136a and 132b, 136b for moving the tracked robot 100. The motor 135 is configured to power each of the tracks 120a, 120b in a forward direction or a backward direction through the sprockets 133a, 137a, 133b, and 137b on the driving wheels 132a, 136a and 132b, 136b respectively. A variety of gears and gear trains comprise the transmission system of the tracked robot 100 for transmitting mechanical energy from the motor 135 to the driving wheels 132a, 136a and 132b, 136b. The motor 135 is configured to receive control signals from the control unit located in the chassis 110. The motor 135 may be an electric motor, a fuel powered engine, or any motor known or yet to be developed. The motor 135 is coupled to a power source (not shown) disposed in the chassis 110. The control unit (not shown) in the chassis 110 generates a signal for actuating the motor 135 based on information provided by the sensors on the tracks 120a, 120b.

In some embodiments, the drive system 130 may include a fixed wheel 134a coupled to the track 120a and either or both the driving wheels 132a, 136a. Similarly, the drive system 130 may include a fixed wheel 134b coupled to the track 120b and either or both the driving wheels 132b, 136b.

Figure 3A:
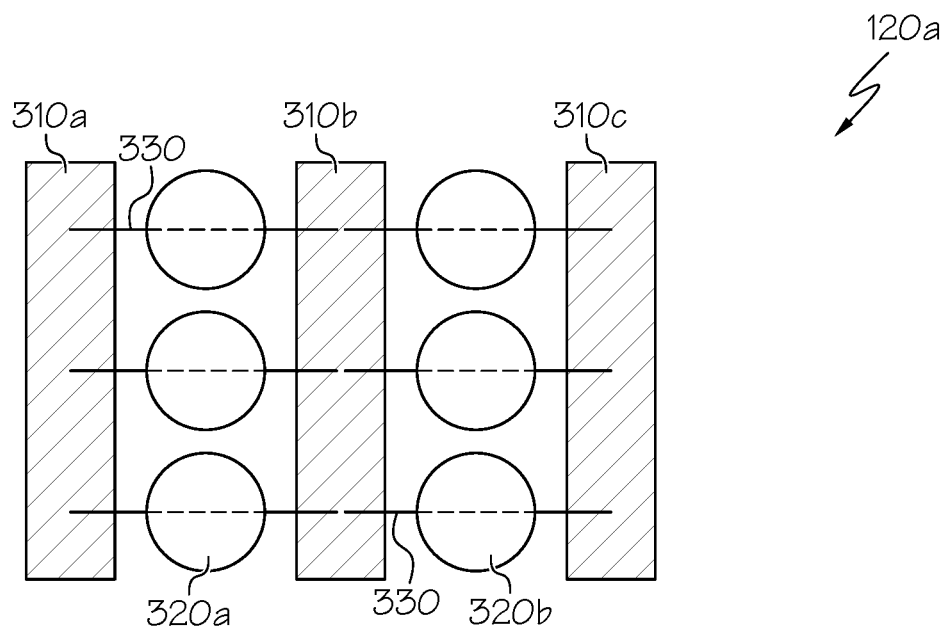
FIG. 3A depicts a schematic representation of a top view of an example embodiment of a track with an anti-scrubbing mechanism, according to one or more embodiments shown and described herein.
Figure 3B:
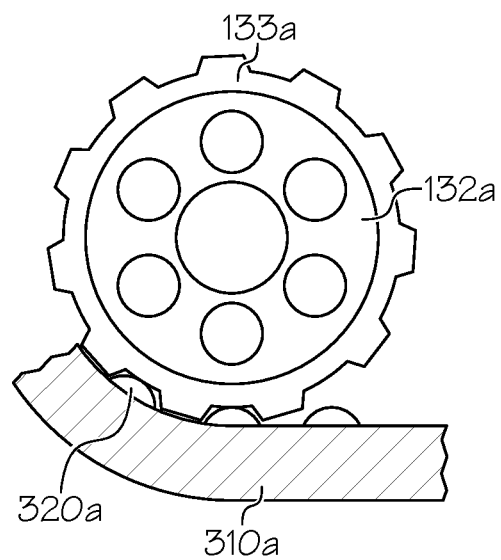
FIG. 3B depicts a schematic representation of a side view of the example embodiment of the track with the anti-scrubbing mechanism shown in FIG. 3A, according to one or more embodiments shown and described herein.

FIGS. 3A and 3B depict schematic representations of a top view and a side view of an example embodiment of a track 120a of the tracked robot 100. The track 120a includes track segments 310a, 310b, 310c along the length of the track 120a. A plurality of rollers 320a are coupled between the track segments 310a and 310b along the length, while a plurality of rollers 320b are coupled between the track segments 310b and 310c along the length of the track 120a. The plurality of rollers 320a, 320b form an alternating arrangement between the track segments 310a, 310b, 310c along the width of the track 120a. The plurality of rollers 320a, 320b may be made of a rigid, preferably impact-resistant hard rubber material such as, but not limited to, Ebonite® or a generic equivalent of Ebonite®.

In the embodiment depicted in FIGS. 3A and 3B, the plurality of rollers 320a, 320b are coupled to the track segments 310a, 310b, 310c through cables 330 attached to the surrounding track segments 310a, 310b, 310c. For example, the roller 320a is coupled between the track segments 310a and 310b by the cable 330 attached between the track segment 310a and 310b. The plurality of rollers 320a, 320b are free to rotate about the respective cables 330 in either clockwise or anticlockwise direction as the track 120a rotates around the driving wheels 132a, 136a. The cables 330 may be made of a metal or a heat-resistant high-strength and lightweight synthetic fibrous material such as, but not limited to Kevlar® or a generic equivalent of Kevlar®. In some embodiments, the cable 330 passing through the track segments 310a, 310b and the roller 320a is separate from the cable passing through the track segments 310b, 310c and the roller 320b. In other embodiments, the cable 330 is a single continuous cable passing through the track segments 310a, 310b, 310c and the plurality of rollers 320a, 320b.

Figure 4A:
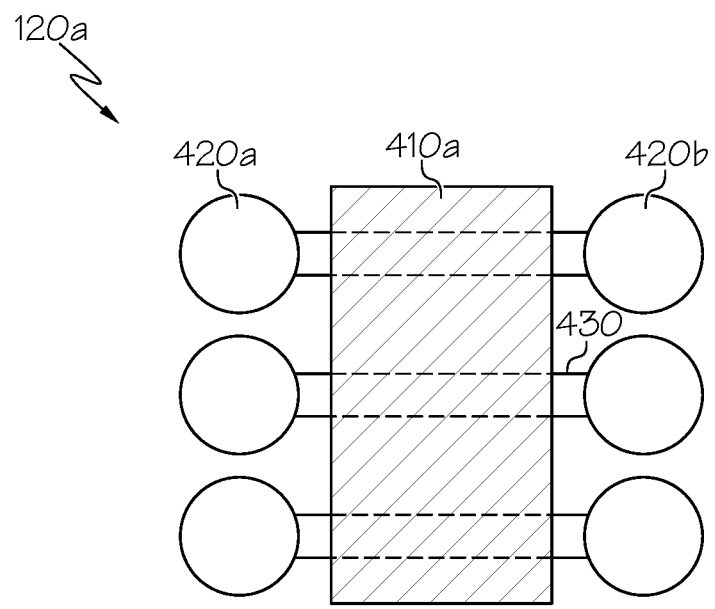
FIG. 4A depicts a schematic representation of a top view of another example embodiment of a track with an anti-scrubbing mechanism, according to one or more embodiments shown and described herein.
Figure 4B:
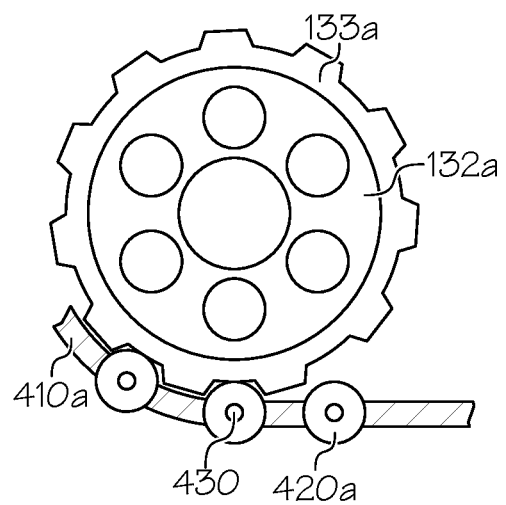
FIG. 4B depicts a schematic representation of a side view of another example embodiment of the track with the anti-scrubbing mechanism shown in FIG. 4A, according to one or more embodiments shown and described herein.

FIGS. 4A and 4B depict schematic representations of a top view and a side view of another example embodiment of a track 120a of the tracked robot 100. The track 120a includes the track segment 410a along the length of the track 120a. A plurality of rollers 420a and 420b are coupled on either side of the track segment 410a along the length of the track 120a. The plurality of rollers 420a, 420b form an alternating arrangement on either side of the track segment 410a along the width of the track 120a. The plurality of rollers 420a, 420b may be made of a rigid, preferably impact-resistant hard rubber material such as, but not limited to, Ebonite® or a generic equivalent of Ebonite®.

In the embodiment depicted in FIGS. 4A and 4B, the plurality of rollers 420a, 420b are coupled to the track segment 410a through rods 430 passing through the track segment 410a. For example, the rollers 420a and 420b are coupled on either side of the track segment 410a by the rod 430. The plurality of rollers 420a, 420b are free to rotate about the respective rod 430 in either clockwise or anticlockwise direction as the track 120a rotates around the driving wheels 132a, 136a. The rods 430 may be made of a metal or a high strength material.

In operation, the plurality of rollers 320a, 320b and 420a, 420b can be advantageously utilized by the tracked robot 100 to make swift and smooth turns, including zero-radius turns and acute-angle turns. When the sensors located on the tracks 120a, 120b detect an obstacle in the path of the tracked robot 100, information regarding the details of the obstacle is communicated to the control unit in the chassis 110. The control unit determines the best way to maneuver around the obstacle. The control unit sends a control signal to the motor 135 to actuate the driving wheels 132a, 136a, 132b, and 136b in accordance with the determination. The driving wheels 132a, 136a, 132b, and 136b thus move the tracks 120a, 120b. The plurality of rollers 320a, 320b or 420a, 420b disposed between the track segments 310a, 310b, 310c or 410a are actuated based on the direction of movement of the driving wheels 132a, 136a, 132b, and 136b. The plurality of rollers 320a, 320b or 420a, 420b prevent the driving wheels 132a, 136a, 132b, and 136b from scrubbing against the tracks 120a, 120b and ensures that there is little or no friction between the tracks 120a, 120b and the corresponding driving wheels 132a, 136a, 132b, and 136b as the tracked robot 100 turns.

The plurality of rollers 320a, 320b or 420a, 420b can be distributed in a number of different ways along the track 120a and is not limited by the embodiments shown in FIGS. 3A-3B and 4A-4B. The arrangement of the plurality of rollers 320a, 320b or 420a, 420b alternating between track segments 310a, 310b, 310c or 410a of the tracks 120a, 120b enables the tracked robot 100 to make zero-radius and acute-angle turns swiftly and smoothly, while incurring significantly less wear and damage to the driving wheels 132a, 136a, the fixed wheels 134a and the surface of the tracks 120a, 120b.

It should now be understood that the anti-scrubbing mechanism described herein can be beneficially implemented on a tracked robot or a tracked vehicle—autonomous or driven—such as, but not limited to, unmanned ground vehicles (UGV), military tanks, industrial material-handling robots. The anti-scrubbing mechanism helps reduce scrubbing and prevents friction between the track and the driving wheels of the tracked robot or the tracked vehicle during zero-radius turns for moving in the opposite direction as well as during acute-angle turns, where the angle between the pre-turn path and the post-turn path is less than about 90 degrees.

It is noted that the terms "substantially" and "about" may be utilized herein to include the inherent degree of uncertainty that may be attributed to any quantitative comparison, value, measurement, or other representation. These terms are also utilized herein to represent the degree by which a quantitative representation may vary from a stated reference without resulting in a change in the basic function and intended scope of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A tracked robot comprising:
    one or more tracks coupled to a chassis of the tracked robot, each of the one or more tracks comprising:
        one or more track segments along a length of each of the one or more tracks; and
        a plurality of rollers coupled to the one or more track segments along the length of each of the one or more tracks, wherein each of the plurality of rollers is coupled to the one or more track segments by cables coupled to the one or more track segments and each of the plurality of rollers is configured to rotate around the cables; and
    a drive system mechanically coupled to the one or more tracks and the chassis of the tracked robot.

2. The tracked robot of claim 1, wherein each of the plurality of rollers are made of a hard rubber material.

3. The tracked robot of claim 1, wherein the cables are made of a heat-resistant high-strength and lightweight synthetic fibrous material.

4. The tracked robot of claim 1, wherein the drive system further comprises:
    one or more driving wheels configured to propel the tracked robot forward or backward, wherein each of the one or more tracks are rotatably wrapped around at least one of the one or more driving wheels;
    one or more toothed sprockets coupled to each of the one or more driving wheels; and
    a motor coupled to the one or more driving wheels and configured to power each of the one or more tracks in a forward direction or a backward direction through the one or more toothed sprockets.

5. The tracked robot of claim 4, wherein the drive system further comprises one or more fixed wheels coupled to each of the one or more tracks and the one or more driving wheels.

6. The tracked robot of claim 1, wherein each of the plurality of rollers and the one or more track segments are arranged alternately along a width of each of the one or more tracks.

7. A track system for a vehicle comprising:
    one or more tracks coupled to a chassis of the vehicle, each of the one or more tracks comprising:
        one or more track segments along a length of each of the one or more tracks; and
        a plurality of rollers coupled to the one or more track segments along the length of each of the one or more tracks, wherein each of the plurality of rollers is coupled to the one or more track segments by cables coupled to the one or more track segments and each of the plurality of rollers is configured to rotate around the cables; and
    a drive system mechanically coupled to the one or more tracks and the chassis of the vehicle.

8. The track system of claim 7, wherein each of the plurality of rollers are made of a hard rubber material.

9. The track system of claim 7, wherein the cables are made of a heat-resistant high-strength and lightweight synthetic fibrous material.

10. The track system of claim 7, wherein the drive system further comprises:
    one or more driving wheels configured to propel the vehicle forward or backward, wherein each of the one or more tracks are rotatably wrapped around at least one of the one or more driving wheels;
    one or more toothed sprockets coupled to each of the one or more driving wheels; and
    a motor coupled to the one or more driving wheels and configured to power each of the one or more tracks in a forward direction or a backward direction through the one or more toothed sprockets.

11. The track system of claim 10, wherein the drive system further comprises:
    one or more fixed wheels coupled to each of the one or more tracks and the one or more driving wheels.

12. The track system of claim 7, wherein each of the plurality of rollers and the one or more track segments are arranged alternately along a width of each of the one or more tracks.

13. A tracked robot comprising:
- one or more tracks coupled to a chassis of the tracked robot, each of the one or more tracks comprising:
  - one or more track segments along a length of each of the one or more tracks; and
  - a plurality of rollers coupled to the one or more track segments along the length of each of the one or more tracks, wherein each of the plurality of rollers and the one or more track segments are arranged alternately along a width of each of the one or more tracks, each of the plurality of rollers is coupled to the one or more track segments by cables coupled to the one or more track segments, and each of the plurality of rollers is configured to rotate around the cables;
- a drive system mechanically coupled to the one or more tracks and the chassis of the tracked robot, the drive system comprising:
  - one or more driving wheels configured to propel the tracked robot forward or backward, wherein each of the one or more tracks are rotatably wrapped around at least one of the one or more driving wheels;
  - one or more toothed sprockets coupled to each of the one or more driving wheels;
  - a motor coupled to the one or more driving wheels and configured to power each of the one or more tracks in a forward direction or a backward direction through the one or more toothed sprockets; and
  - one or more fixed wheels coupled to each of the one or more tracks and the one or more driving wheels.

14. The tracked robot of claim 13, wherein:
the cables are made of a heat-resistant high-strength and lightweight synthetic fibrous material.

15. The tracked robot of claim 13, wherein each of the plurality of rollers are made of a hard rubber material.

* * * * *